March 11, 1952 I. MOLNAR 2,589,113

FREQUENCY MODULATED TONE UNITS

Filed Nov. 22, 1949

3 Sheets-Sheet 1

INVENTOR.
IMRE MOLNAR

BY

ATTORNEY

March 11, 1952

I. MOLNAR 2,589,113

FREQUENCY MODULATED TONE UNITS

Filed Nov. 22, 1949

3 Sheets-Sheet 2

INVENTOR.
IMRE MOLNAR

BY Chas. Wm. Candy

ATTORNEY

March 11, 1952 I. MOLNAR 2,589,113

FREQUENCY MODULATED TONE UNITS

Filed Nov. 22, 1949 3 Sheets-Sheet 3

INVENTOR.
IMRE MOLNAR

BY Chas. [signature]

ATTORNEY

Patented Mar. 11, 1952

2,589,113

UNITED STATES PATENT OFFICE 2,589,113

FREQUENCY MODULATED TONE UNITS

Imre Molnar, Chicago, Ill., assignor to Automatic Electric Laboratories, Inc., Chicago, Ill., a corporation of Delaware Application November 22, 1949, Serial No. 128,777

12 Claims. (Cl. 179—16.4)

The present invention relates to telephone systems in general, but is concerned more particularly with telephone systems wherein automatic switches employed in the setting up of connections are controlled by alternating current pulses transmitted over the talking conductors of interexchange toll or long distance lines.

The object of this invention is to provide a new and improved auxiliary unit known as the tone unit which is operatively responsive to signals consisting of frequency modulated currents.

A feature is that the same modulated carrier is used for both dialing and signaling.

Another object is to provide immunity against interference with the voice frequency pulses used for signaling.

Another feature of the present invention is that amplitudes of varying magnitude of incoming signals are leveled off, and therefore attenuations in lines can be tolerated as long as a reasonable signal to noise ratio is maintained.

Other objects and features will appear upon a further perusal of the specification and accompanying drawings.

The voice frequency dialing system used in Patent No. 2,155,176, granted on April 18, 1939 to John Wicks transmits a 1000 cycle tone of approximate speech level, corresponding to the speed and ratio of regular dialing or key sender pulses, to directly control Strowger type switches. For signals other than dial pulses a similar 1000 cycle tone of varying duration is transmitted, but its amplitude is modulated by a 60 cycle sine wave. In the receiver, tuned circuits insure that frequencies beyond a fairly narrow bank on each side of 1000 cycles are rapidly attenuated. The one thousand cycle dial pulses, after amplifying and rectifying actuate a fast pulse relay to convert them into D. C. pulses. The amplitude modulated signals are also passed through amplifiers and detectors to reduce them to 60 cycles which again provide D. C. pulses into the repeater.

In the telephone system of the Wicks patent, an operator at an operator position in a first exchange may extend a connection over the toll line to switching apparatus in a second exchange, and then control the switching apparatus further to extend the connection. During these operations a first tone unit associated with a first repeater circuit, associated with a first end of the toll line in the first exchange, cooperates with a second tone unit associated with a second repeater circuit, associated with a second end of the toll line in the second exchange. Each of the tone units is capable of transmitting and of receiving both unmodulated 1000 cycle signals and 60–50 cycle modulated 1000 cycle signals, which are utilized for the various dial and supervisory purposes.

The present invention replaces the amplitude modulated signals with a frequency modulated system and thereby prevents interference from induced noises in the circuit, which are detrimental to operation. Further, the present invention eliminates the use of the monitoring transformer at the sending end, since speech or noise from the calling side are not likely to interfere with operations. The pulsing relay will now be responsive to the modulated frequency signal. The present invention discloses a system whereby the same modulated carrier is used for both dialing pulses and signaling pulses; whereas the prior systems used a modulated carrier for signaling pulses and pure carriers for dialing pulses.

Figure 1:
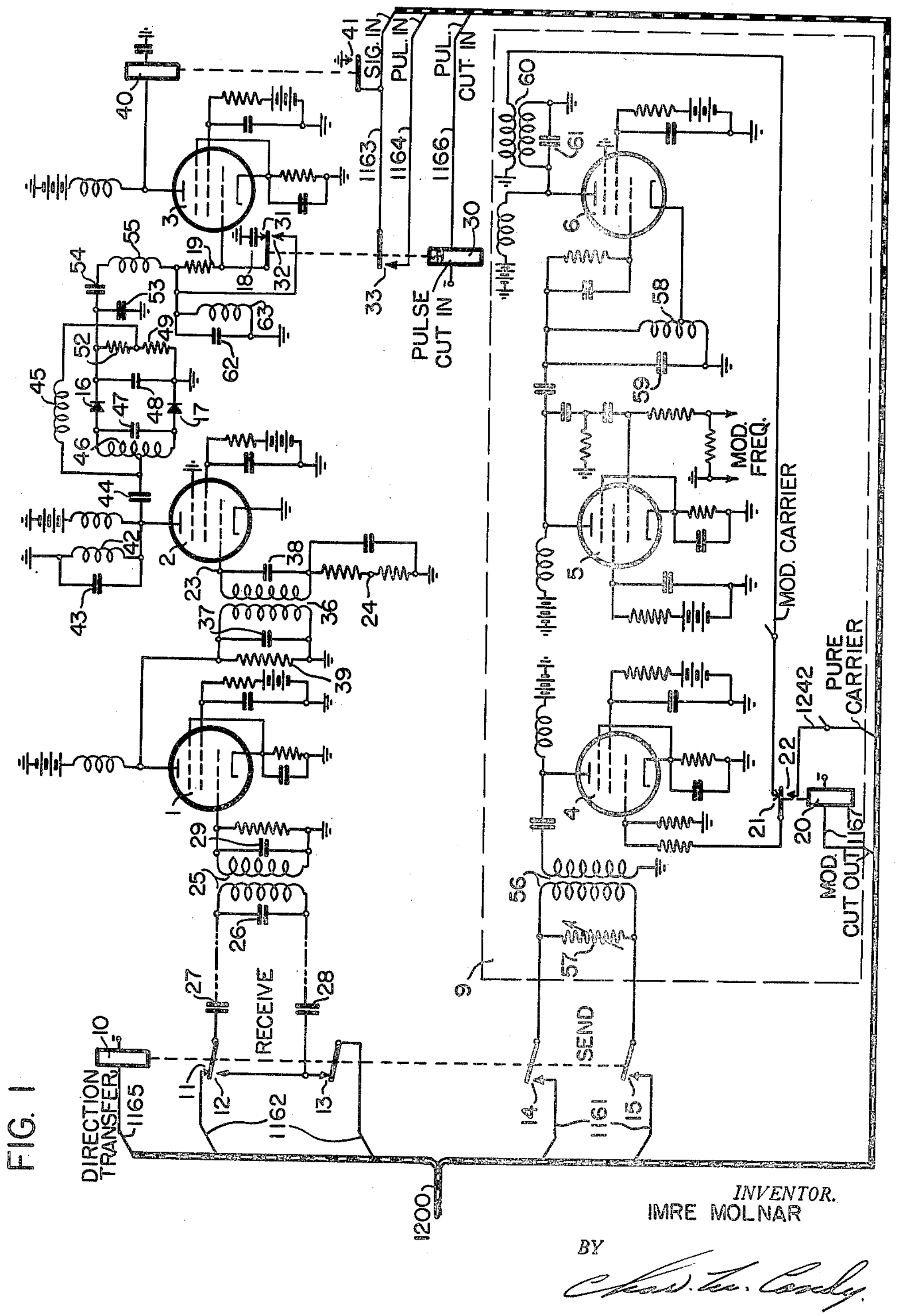
Fig. 1 shows a diagrammatic representation of the present invention illustrating both the sending and receiving circuits of the frequency modulation tone unit for voice frequency dialing, and is responsive only to a modulated carrier for both dialing and signaling.

The tone unit herein disclosed is an improvement of the tone unit disclosed in Patent 2,159,081, granted on May 23, 1939, to Otho D. Grandstaff. The improved tone unit may be used to replace the tone unit shown in Fig. 12 of Patent 2,155,176, granted on April 18, 1939, to John Wicks as the leads incoming to the tone unit disclosed herein are similar in function and number to the leads interconnecting the tone unit in the aforementioned Wicks patent with the associated repeater.

The tone unit disclosed herein is one of a group of tone units and each tone unit is associated with each end of a two-way alternating current dialing toll line, being interconnected with an impulse repeater. The tone unit together with the conductors leading through cables 1200 are assumed to extend to an associated impulse repeater as disclosed in the aforementioned Wicks patent. Therefore, the character designations for the conductors used in this disclosure will correspond to the character designations for similar conductors used in the Wicks patent.

The signals received over the associated toll line come into the tone circuit through receiving conductors 1162 of the cable 1200; while the transmitted signals go out over sending conductors 1161 of the cable 1200 to the conductors of the toll line.

Direction-transfer relays 10 and 10a are normally energized over conductor 1165 of cable 1200. Direction-transfer relays 10 and 10a are similar in operation and function to direction-transfer relay 1202 of the aforementioned Wicks patent. With direction-transfer relays 10 and 10a in their normally energized condition, the tone units are conditioned for the reception of signals. These relays are restored to adapt the tone units for transmission. It is to be noted that relay 10 is used in the tone units shown in Figs. 1 and 2; while relay 10a is used in the tone unit shown in Fig. 3, which is a modification of the tone unit shown in Fig. 1.

Modulation-cut-off relays 20 and 20a are controlled over modulation-cut-off conductor 1167 of cable 1200 to enable the tone units to transmit either a modulated carrier frequency or a pure carrier frequency, as may be desired. Modulation-cut-off relays 20 and 20a are similar in function and operation to the modulation-cut-off relay 1201 of the aforementioned Wicks patent. Modulation cut-off-relay 20 is used in the tone unit shown in Figs. 1 and 2; while modulation-cut-off relay 20a is used in the tone unit shown in Fig. 3 which is a modification of the tone unit shown in Fig. 1.

Pulse-cut-in relays 30 and 30a are controlled over pulse-cut-in lead 1166 of the cable 1200 to prepare the circuits for receiving of the switch operating pulses and also to prepare the time delay circuits during the receiving time of the signaling pulses. Pulse-cut-in relays 30 and 30a are similar in operation and function to the pulse-cut-in relay 1204 of the aforementioned Wicks patent. Pulse-cut-in relay 30 is used in the tone units shown in Figs. 1 and 2; while pulse-cut-in relay 30a is used in the tone unit shown in Fig. 3 which is a modification of the tone unit shown in Fig. 1.

Referring now to Fig. 1, the tone unit illustrated therein is a system whereby the same modulated carrier is used for both dialing pulses and signaling pulses. The tone unit shown in Fig. 1 comprises both the sending and receiving circuits. The receiving circuit comprises tubes 1, 2 and 3. The tubes may be of the well-known 6SJ7 type of pentode tube and are all shown self-biased. Tube 1 represents the tuned amplifier stage; tube 2 represents the limiter stage; tube 3 represents the final amplifier stage. Dry disc rectifiers 16 and 17 are the rectifiers of the discriminator stage. A. C. relay 40 is fast-to-operate in response to amplified 60 cycle current and stays operated for the duration of this amplified current, and is fast-to-release when this amplified current ceases, and is used for producing the D. C. pulses to be transmitted to the associated repeater, not shown. Condenser 18 and resistor 19 comprise a time delay circuit which is effective during the receiving of signaling pulses.

The sending circuit 9 comprises tubes 4, 5 and 6. Tubes 4, 5 and 6 may be of the well-known pentode type tubes and are self-biased. Tube 4 represents the sending amplifier stage; tube 5 is the well-known reactance tube and is used to produce a modulated carrier; tube 6 is an oscillator and may be used to produce a 2000 cycle signal.

Figure 2:
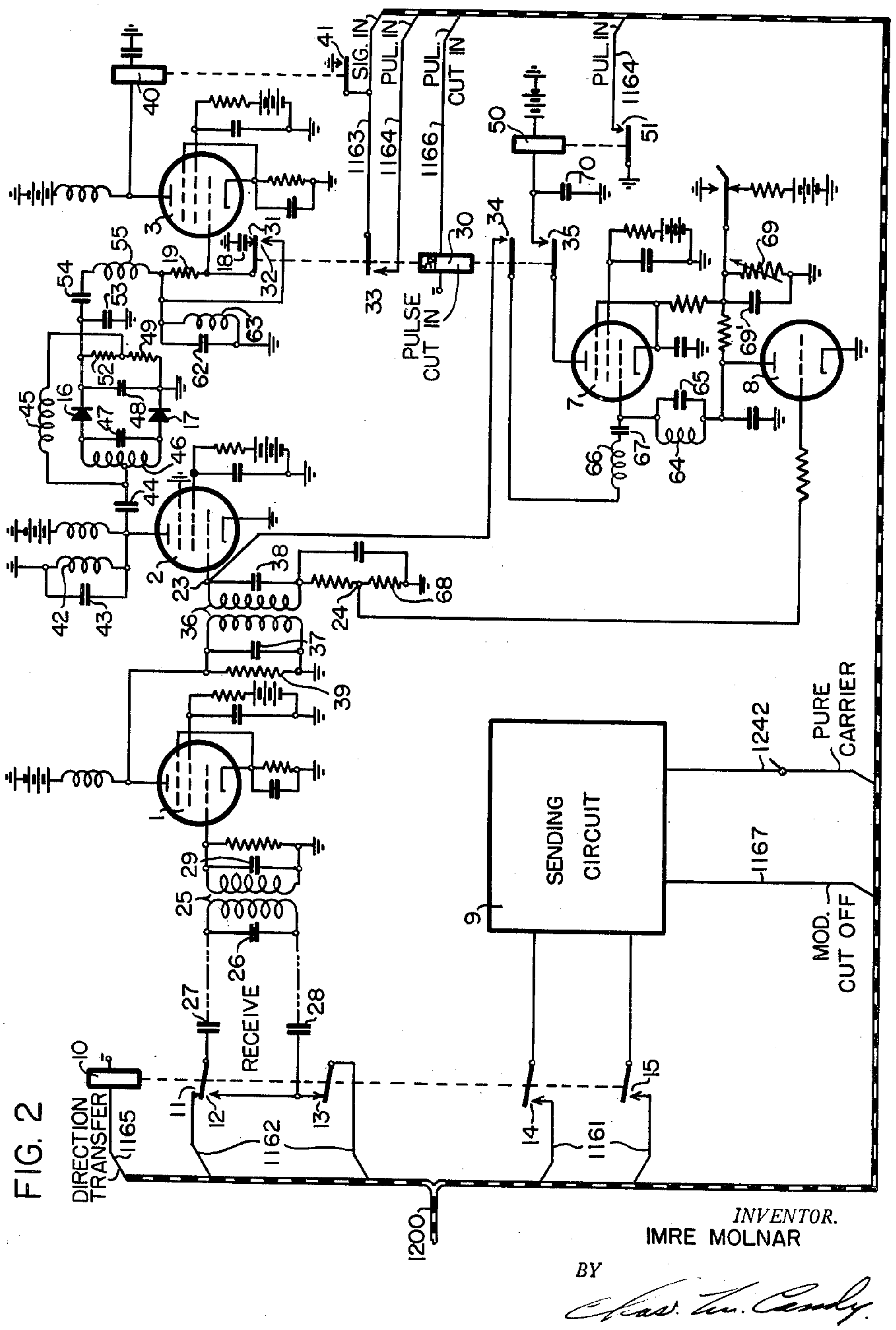
Fig. 2 illustrates the same circuit as shown in Fig. 1 and in addition thereto a circuit responsive to a pure carrier frequency whereby the pure carrier frequency is used for dialing and the modulated carrier frequency is used for signaling.

Referring now to Fig. 2, the tone circuit illustrated therein is similar to that shown in Fig. 1 and in addition thereto a pure carrier receiving circuit is tapped off at junctions 23 and 24. Fig. 2 permits, when desirable, the receiving of a modulated carrier for signaling pulses and the pure carrier for dialing pulses. The receiving circuit shown in Fig. 1 is not responsive to the pure carrier, and therefore the additional circuit only, comprising tubes 7 and 8, would be responsive to the pure carrier signal. Tube 8 is a triode tube and is a bias control rectifier; tube 7 represents the final amplifier stage and is a class B amplifier biased to cut-off. In the plate circuit of tube 7 is relay 50 a fast-to-operate and fast-to-release relay, which is used for producing the D. C. dialing pulses. Block diagram 9 is similar to the sending circuit shown in Fig. 1. The remainder of the elements are similar to those shown in Fig. 1 and corresponding character designations of the elements are used in both figures.

Figure 3:
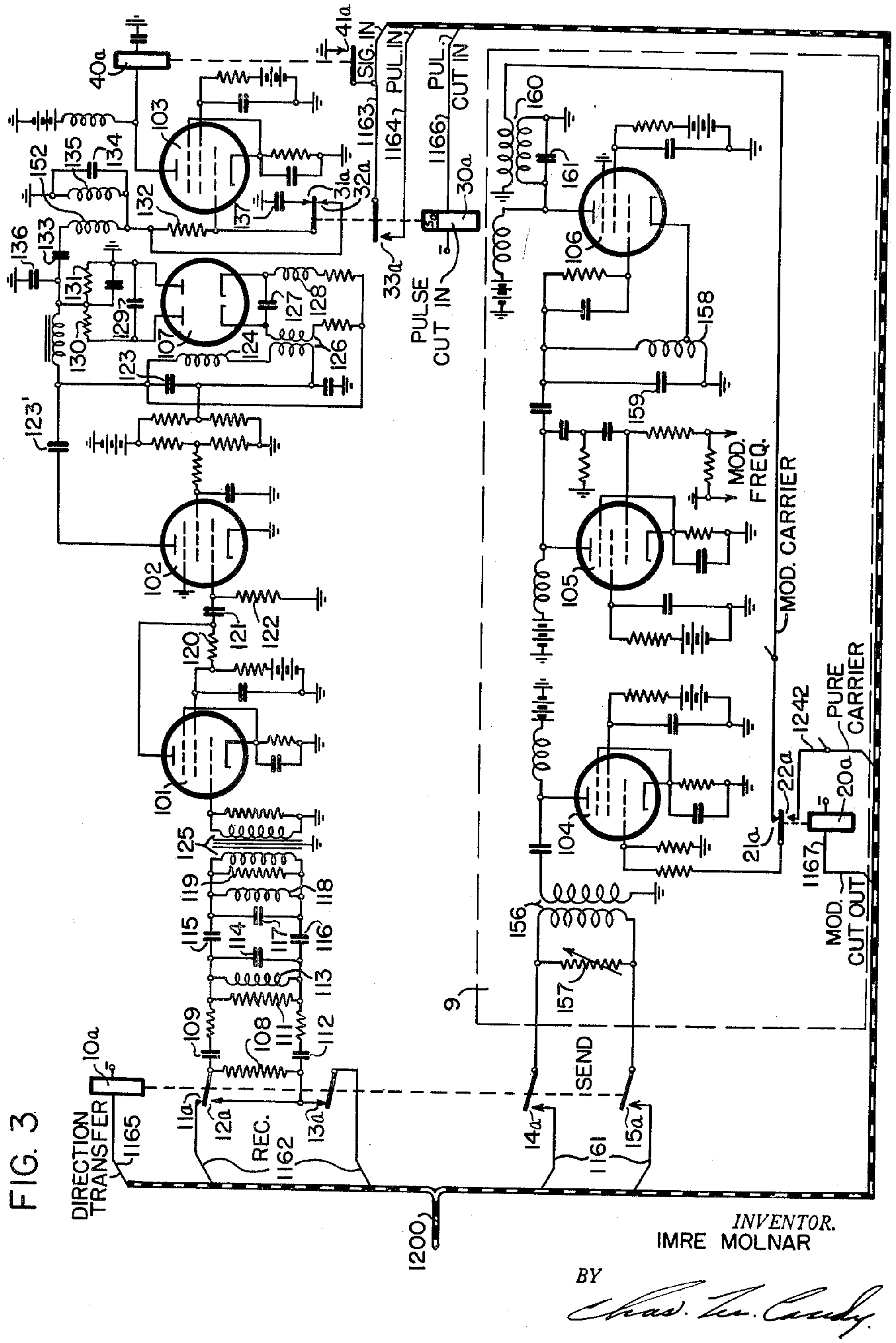
Fig. 3 shows a modification of Fig. 1 by substituting a different tuned amplifier, limiter and discriminator stages.

Referring now to Fig. 3, the tone unit shown therein is a modification of the tone unit shown in Fig. 1. The function and operation of Fig. 3 is similar to that of Fig. 1, where a modulated carrier is used for both dialing and signaling pulses. Tubes 101, 102 and 103 may be pentode tubes and may be of the 6SJ7 type and are self biased tubes. Tube 101 represents the amplifier stage; tube 102 represents the limiter stage; tube 103 represents the final amplifier stage and the tube 107 represents the discriminator stage. Tube 107, a twin-diode tube, may be of 6H6 type tube. The sending circuit is similar to that shown in the tone unit illustrated in Fig. 1. Relay 40a is similar to relay 40 shown in Fig. 1. Fig. 3 differs from Fig. 1 in that there is a different tuned amplifier, limiter and discriminator stage substituted for those shown in Fig. 1.

The carrier frequency used for the present invention may be of the order of 2000 cycles per second and the modulating frequency may be of the order of 60 cycles per second.

Referring now to Fig. 1 for the operation of the tone unit shown therein. The receiving circuit is normally connected to conductor 1162 at contacts 11 and 13, direction-transfer relay 10 being normally operated as explained in the above-mentioned Wicks patent. The sending circuit is not connected to the conductors 1161 at this time for the reasons mentioned above. A modulated carrier signal is received through conductors 1162 and is impressed on the primary winding of the transformer 25 through the tuned circuit, shown by condenser 26 and the primary winding of transformer 25; condensers 27 and 28 and the contacts 11 and 13. The modulated carrier signal then passes through another tuned circuit comprising the secondary winding of transformer 25 and condenser 29, and is then impressed on the grid of tube 1. The tuned circuits comprising the transformer 25 are tuned to permit a band corresponding to the frequency deviation on either side of the carrier. The stage just described is the tuned amplifier stage. The modulated carrier signal is amplified and the amplified modulated carrier signal is impressed across the load resistor 39 and then impressed across the tuned circuit comprising condenser 37 and the primary winding of transformer 36. The tuned circuit comprising the secondary winding of transformer 36 and condenser 38 receive the amplified modulated carrier and feed the same to the limiter stage by way of the grid of tube 2. The tuned circuit comprises condenser 39 and the secondary winding of transformer 36, tuned to the same frequency as the preceding tuned circuits. At tube 2, the limiter permits the signal to raise to a certain predetermined level, above which the magnitude of all signals are cut off. The peak limiter herein described is an amplifier so controlled that the gain is quickly reduced when the instantaneous peak amplitude of the signal being amplified exceeds a predetermined value. The amplified modulated carrier signal with a constant magnitude is received from the plate circuit of the tube 2 across the tuned circuits, comprising inductance coil 42 and condenser 43 and another tuned circuit comprising coil 46 and condenser 47. Blocking condenser 44 blocks out the D. C. plate voltage and the signal is now received by the discriminator circuit. Dry disc rectifiers 16 and 17 are used since the carrier frequency is relatively low. The discrimination of the frequency modulated carrier is accomplished by distorting the frequency spectrum of the wave in a manner that causes the envelope to fluctuate in accordance with the intelligence involved, which in this case is a 60 cycle per second intelligence. The wave is then rectified by rectifiers 16 and 17. The arrangement herein shown does not respond to amplitude modulations of the incoming carrier, because the effects of amplitude variations are balanced out in the discriminator circuit. As a consequence the circuit is an inherent discriminator against noise and interfering signals that are weaker than the incoming frequency modulated carrier. In more detail, tuned circuit 42 43 is tuned to the same frequency, which is the carrier frequency, as is tuned circuits 46 47 and the respective circuits are coupled for the A. C. signals by the condenser 44. At resonance the voltage appearing across the respective tuned circuits are 90 degrees out of phase with one another. As the frequencies go off resonance, the phase between the voltages will change thereby creating a different input voltage to the rectifiers 16 and 17. The difference in the rectified voltages is the intelligence. The inductance coil 45 is used for the D. C. return path. The rectified voltages are then received by the condenser 48 and resistors 49 and 52 and appear now as an A. C. signal of 60 cycles per second.

Condensers 53, 54 and 62 and coils 55 and 63 form a filter circuit, which rejects all frequencies except the 60 cycle modulating frequency.

It is to be noted that pulse-cut-in relay 30 is provided to be controlled over pulse-cut-in conductor 1166. When the tone unit is to be used to receive dial impulses from a distant exchange, relay 30 operates in response to the operation of the associated repeater, as described in the above-mentioned Wicks patent.

However, when the tone unit is to be used to receive signal impulses, relay 30 does not operate. Therefore, when a dial impulse is received the time delay circuit condenser 18 is not in the circuit. However, when signaling impulses are received the time delay circuit condenser 18 is put in the circuit by releasing relay 30 to make contacts 31, which provides a lag in time to elapse between the application of the signal and response of relay 40. The time delay circuit comprises both resistor 19 and condenser 18. The 60 cycle signal is now received by the grid of tube 3 across the resistor 19. The 60 cycle signal is now amplified by the final amplifier. Included within the plate circuit of tube 3 is the relay 40 and it is an A. C. relay which is well-known in the art. Relay 40 operates in response to the duration of the amplified 60 cycle signal. In the instances when a signal impulse is sent, relay 40 puts ground on contacts 41 to produce a D. C. pulse over the conductor 1163 to the associated repeater, not shown. In the instances when dialing impulses are received, relay 40 is operated for each modulated frequency impulse and a D. C. pulse is sent for each operation of relay 40 through contacts 41 and 33 over conductor 1164 to the associated repeater, not shown. Further, when said dial impulses are transmitted the associated repeater, not shown, is not receptive to signals from the conductor 1163.

When the tone circuit is to be used to transmit a seizing pulse over the associated toll line, as described in the Wicks patent, the direction-transfer relay 10 is restored and contacts 14 and 15 make to complete the circuit from the sender circuit to conductor 1161 over cable 1200; and contacts 11 and 13 break to remove the receiving circuit from conductors 1162 of cable 1200.

In the instances when a pure carrier signal is to be transmitted, relay 20 is operated over conductor 1167 of cable 1200. An alternating frequency source, not shown, is connected to the conductor 1242, and may be of a frequency of 2000 cycles per second. The pure carrier is then received by the grid of tube 4 of the sending amplifier. The pure carrier signal is amplified and impressed across the output transformer 56 and output level control 57 over the contacts 14 and 15 to the sending conductors 1161 of the cable 1200 to the conductors of the toll line.

In the instances, when a modulated carrier is to be sent out, relay 20 releases and contacts 21 make to prepare the circuit from the oscillator tube 6 to the sending amplifier tube 4. Tube 6 represents an oscillatory circuit which may oscillate at a frequency of 2000 cycles per second. The tank circuit comprising condensers 59 and inductance coil 58 is tuned to the carrier frequency. The operation of the oscillator is well-known in the art. The feed back circuit is similar to the well-known Hartley oscillator, however, the plate circuit is not used for feed back and thereby operates similar to the electron coupled oscillator, which is also well-known in the art. Tube 5 is a reactance tube, which is also well-known in the art. Both tubes 5 and 6 are common to all tone units. A modulating frequency, preferably a 60 cycle signal, is impressed upon the grid of tube 5. The modulating frequency source is not shown. The modulating frequency when impressed on the grid of tube 5 will vary the plate current in tube 5, in the manner well-known in the art, and the variation of plate current is effective to vary the effective resonant frequency of the tank circuit, condenser 59, inductance coil 58, to thereby cause the carrier frequency to be modulated in accordance to variation of plate current from tube 5. The modulated frequency is impressed on the grid of tube 6 and the nodulated carrier frequency then appears across the primary of transformer 60 and condenser 61. The modulated carrier frequency signal induces a voltage across the secondary of transformer 60. The modulated carrier frequency is then impressed on the grid of tube 4, the sending amplifier, from transformer 60 through contacts 21. The modulated carrier signal is then amplified and sent out to the toll line through conductors 1161 by means of the output transformer 56 and output level control 57. The transmission of switch operating pulses and signaling impulses is controlled from the associated repeater in the manner as described in the Wicks patent.

Referring now to Fig. 2 for the operation of the tone unit shown therein, Fig. 2 differs from Fig. 1 in that a circuit, including tubes 7 and 8, is tapped at junctions 23 and 24. The additional circuit now permits a pure carrier signal to be received for the dialing impulses and a modulated carrier signal to be used for signaling impulses. It is to be noted that in Fig. 1 the system is not responsive to a pure carrier frequency for the reasons heretofore stated. Relay 50 has also been added to produce the D. C. dialing pulses for the associated repeater, not shown; whereas relay 40 will produce the D. C. signaling pulses for the associated repeater, not shown. Both relays are of the well-known A. C. relay type.

Assume at this point that a pure carrier frequency is received by the tone unit of Fig. 2. The receiving circuit is normally connected to conductors 1162 at contacts 11 and 13, since direction-transfer relay 10 is normally operated. The sending circuit is not connected to conductors 1161 at this time for the reasons mentioned above. A pure carrier signal for dialing pulses is received through conductors 1162 and is impressed on the primary side of transformer 25 through the tuned circuit, shown by condenser 26 and the primary winding of transformer 25; condensers 27 and 28 and contacts 11 and 13. The pure carrier signal then passes through another tuned circuit comprising the secondary winding of transformer 25 and condenser 29, and is then impressed on the grid of tube 1. The tuned circuits comprising the tranfsormer 25 are tuned to permit a band corresponding to the frequency deviation on either side of the carirer. The stage just described is the tuned amplifier stage. The pure carrier signal is amplified and the amplified carrier is impressed across the load resistor 39 and then impressed across the tuned circuit comprising condenser 37 in the primary winding of transformer 36. The tuned circuit comprising the secondary winding of transformer 36 and condenser 38 receive the amplified pure carrier signal. The pure carrier signal is blocked by the discriminator stage, comprising rectifiers 16 and 17, condensers 43 and 47 and inductance coils 42 and 46 in a manner previously described in the operation of Fig. 1. Therefore, a pure carrier signal will never reach the final amplifier stage, tube 3.

It is to be noted, as explained in the Wicks patent, that during the period that dialing impulses are received relay 30 is operated thereby closing contacts 34 to complete a circuit to the grid of the class B amplifier, tube 7. Tube 7 is biased to a cut-off potential. Contact 35 closes to complete a path to the A. C. pulsing relay 50. Tuned circuit comprising inductance coil 64 and condenser 65 will only pass frequencies within a few cycles of the pure carrier frequency.

The voltage induced in the tuned circuit, secondary winding of transformer 23 and condenser 28, is impressed on the grid of the class B amplifier tube 7 after being filtered by the tuned circuit, inductance coil 64 and condenser 65, through the following elements: contacts 34, coil 66 and condenser 67.

The class B amplifier tube 7 is biased to cut-off potential. The positive half cycles will be amplified by tube 7 causing D. C. pulsating plate current to flow and operate pulsing relay 50. By-pass condenser 70 gives relay 50 a slug effect. If the noise level of the toll circuit is somewhat high and some of the noise frequencies are within the dialing range, it may be desirable to adjust the bias of tube 7 so that plate current will not flow as long as only noise is on the line. For this purpose tube 8 is included. If steady noise voltage is picked up across resistor 68, it is rectified through tube 8 so as to provide additional bias for tube 7. The resistor 69 and condenser 69′ maintain the bias on tube 7 at its former steady level even while dial pulses are received, although there is additional voltage developed across resistor 68 during the dialing period. This is accomplished by enabling condenser 69′ to charge up to a maximum voltage preceding the dialing period and have a slow discharge through the R. C. network, condenser 69′ and resistor 69. Therefore, when the dial pulses are received, the additional voltage across the resistor 69 does not charge the condenser 69′ substantially. The amplified pure carrier signal appearing at the plate of tube 7 actuates relay 50 through contacts 35. Relay 50 operates to produce DC dialing pulses to the associated repeater, not shown, through contacts 51 over the conductor 1164 of the cable 1200.

The operation of the tone unit for receiving a modulated carrier is similar to that heretofore explained for the reception of the modulated carrier in reference to Fig. 1. During the reception of the modulated carrier relay 30 is restored thereby opening the circuit to tube 7 and relay 50 at contacts 34 and 35, respectively.

The sending circuit represented by a block-diagram 9 is similar to that shown in Fig. 1. The operation and function is likewise similar to that explained in reference to Fig. 1.

Referring now to Fig. 3 for the operation of the tone unit shown therein. The tone unit herein described permits the same modulated carrier to be used for both dialing impulses and signaling impulses. Fig. 3 differs from Fig. 1 in that different tuned amplifier, limiter and discriminator stages are used.

The receiving circuit is normally connected to conductors 1162 at contacts 11 and 13, since direction-transfer relay 10*a* is normally operated. The sending circuit is not connected to conductors 1161 at this time for the reasons mentioned above. A modulated carrier signal is received through conductors 1162 and is impressed over matching impedance resistor 108. Condensers 109 and 112 are D. C. blocking condensers. Resistor 111 is a bridging resistor. Inductance coils 113 and 118 and condensers 114, 115, 116 and 117 form a band pass filter and pass a band corresponding to the frequency deviation on either side of the carrier. Resistor 119 is another matching impedance resistor. The modulated signal voltage appears across transformer 125, which is a step-up transformer and may have a ratio of 3 to 1. The modulated carrier is impressed on the grid of tube 101. The amplified signal is impressed on the grid of tube 102, which represents the limiter circuit. Resistor 120 is the load resistor of amplifier tube 101; condenser 121 is a D. C. blocking condenser; and resistor 122 is the grid resistor of tube 102. At tube 102 the limiter permits the signal to raise to a certain predetermined level and above which magnitude all signals are cut off. The peak limiter herein described is an amplifier so controlled that the gain is quickly reduced when the instantaneous peak amplitude of the signal being amplified exceeds a predetermined value. The voltage from the limiter tube 102 is fed to the discriminator stage comprising a twin-diode tube 107. Blocking condenser 123' blocks out the D. C. plate voltage of tube 102 and the signal is now received by the discriminator.

The demodulation of the frequency modulated carrier is accomplished by distorting the frequency spectrum of the wave in a manner that causes the envelope to fluctuate in accordance with the intelligence involved, which in this case is a 60 cycle per second intelligence. The wave is then rectified by the twin-diode tube 107. The arrangement herein shown does not respond to amplitude modulation of the incoming carrier, because the effects of the amplitude variations are balanced out in the discriminator circuit. As a consequence the circuit has an inherent discrimination against noise and interfering signals that are weaker than the incoming frequency modulated signal. In more detail, the modulated carrier frequency is impressed across a tuned circuit, condensers 123, inductance coil 124 and primary winding of transformer 126; across another tuned circuit, condenser 127, inductance coil 128 and the secondary winding of transformer 126. The respective tuned circuits are coupled by the transformer 126. At resonance the voltage appearing across respective tuned circuits are out of phase with one another. As the frequencies go off resonance, the phase between the voltages will change thereby creating a different input voltage to the rectifiers of the twin-diode tube 107. The difference in the rectified voltage is the intelligence. The rectified voltages are then received by condenser 129 and resistors 130 and 131 and appear now as an A. C. signal of 60 cycles per second.

Condensers 133, 134 and 136 and coils 152 and 135 form a filter circuit which rejects all frequencies except the 60 cycle modulating frequency.

It is to be noted that pulse-cut-in relay 30*a* is provided to be controlled over pulse-cut-in conductors 1166. When the tone circuit is to be used to receive dialing pulses from a distant exchange relay 30*a* operates in response to the operation of the associated repeater, not shown. However, when the tone unit is to be used to receive signal impulses the relay 30*a* is not operated. Therefore, when a dial impulse is received, the time delay circuit condenser 137 is not in the circuit. However, when signal impulses are received, the time delay circuit condenser 137 is put in the circuit by releasing relay 30*a* to make contacts 31*a*, which provides a lag in the time to elapse between the application of the signal and the response of relay 40*a*. The time delay circuit comprises both condenser 137 and resistor 132.

The 60 cycle signal is now received by the grid of tube 103 across resistor 132. The 60 cycle signal is now amplified by the final amplifier. Included within the plate circuit of tube 103 is the relay 40*a* and it is an A. C. relay which is well-known in the art. Relay 40*a* operates in response to the amplified 60 cycle signal in the instances when the signal is sent, relay 40*a* puts ground on contact 41*a* and produces D. C. pulses over the conductor 1163 to the associated repeater, not shown. In the instances when a dialing impulse is sent, relay 30 is operated and D. C. impulses are sent by relay 40*a* over conductors 1164 to the associated repeater, not shown. It is to be noted that during the transmission of dialing pulses, the associated repeater, not shown, is not receptive to pulses from conductor 1163.

When the tone unit is to be used for transmitting voice frequency pulses over the associated toll line, the operation and function is similar to that explained in reference to Fig. 1.

While particular embodiments of the invention have been illustrated, it should be apparent that numerous modifications therein may be resorted to without departing from the true spirit and scope of the invention as defined in the appended claims.

What is claimed is:

1. In a signal receiver for receiving dial pulses and signal pulses, each of said pulses comprising a pulse of audio frequency carrier current frequency modulated current of varying magnitude, and a second outgoing conductor, a pulse cut-in relay in operated position during receipt of dial pulses and in released position during receipt of signal pulses, contacts on said pulse cut-in relay for connecting said first outgoing conductor to said second outgoing conductor during the time said pulse cut-in relay is in the operated position, means for demodulating said frequency modulated current pulses, a signal relay, means controlled by said demodulated current pulse for operating said signal relay for each such pulse received, and a circuit completed in response to each operation of said signal relay for transmitting a direct current impulse over both said outgoing conductors in case said pulse cut-in relay is in operated position or for transmitting a direct current impulse over only one of said outgoing conductors in case said pulse cut-in relay is in released position.

2. In a signal receiver for responding to a frequency modulated by another frequency, a first said frequency modulated current comprising dial impulses at one time interval and signal pulses at another time interval, a limiter circuit controlled by said current for limiting the magnitude of said current to a predetermined value, a discriminator for demodulating said limited current, a signal relay for transmitting direct current pulses, a first means controlled by said demodulated current for operating said signal relay, a first and second outgoing conductor, a second means completed during the dial pulse interval for transmitting direct current dial pulses over said first conductor in response to the operation of said signal relay, and a third means completed during the signal pulse period for transmitting direct current signal pulses over said second conductor in response to the operation of said signal relay.

3. A signal receiver as claimed in claim 2 and in addition thereto a time delay circuit included within said receiver connected to said first means, and said time delay circuit operated during said signal pulse period for producing a lag between the application of said signaling current and the operation of said signal relay.

4. In a signal receiver for responding to a frequency modulated current of varying magnitude, said frequency modulated current comprises dial pulses at one time interval and signal pulses at another time interval, a tuned amplifier responsive to said current for increasing the magnitude of said current and for controlling the band of frequencies of said current passing therefrom, a limiter circuit controlled by said current passing through said amplifier for limiting the magnitude of said current to a predetermined value, a discriminator circuit controlled by the limited magnitude of said current and providing for the demodulation of said current, a final amplifier controlled by the demodulation current for providing for an increase of magnitude of said demodulated current, a signal relay operated in response to said demodulated dialing and signaling current for passing through said final amplifier for transmitting direct current pulses, a first and second outgoing conductor, a first circuit completed during the dial pulse interval for transmitting direct current dial pulses over said first conductor in response to the operation of said signal relay, and a second circuit completed during the signal pulse period for transmitting direct current signal pulses over said second conductor in response to the operation of said signal relay.

5. In a telephone system, a signal receiver, means including said receiver for transmitting dial pulses and signal pulses, each of said pulses comprising a pulse of audio frequency carrier current frequency modulated by another frequency, means in said receiver for receiving similar dial and signal pulses from another similar receiver, said receivers having a dialing period during which said dial pulses are received and having a signaling period during which said signal pulses are received, means in said first receiver for demodulating said frequency modulated pulses transmitted thereto from said other receiver, a signal relay, means controlled by said demodulated current pulses for operating said signal relay for each such pulse received, a dialing circuit completed in response to each operation of said relay during said dialing period for transmitting a direct current switch operating pulse, and a signaling circuit completed in response to each operation of said relay during said signaling period for transmitting a direct current supervisory pulse.

6. In a signal receiver for receiving dial pulses comprising interrupted pulses of carrier current of an audio frequency and signal current pulses comprising modulated pulses of said carrier current having its frequency modulated by another frequency, an amplifier for amplifying each of said interrupted carrier current pulses during receipt of said dial pulses, an outgoing dialing conductor, a signal relay connected to said amplifier and operated in response to each of said amplified carrier current impulses transmitted from said amplifier, a circuit completed in response to each operation of said signal relay for transmitting a direct current pulse over said outgoing dialing conductor, a limiter circuit for limiting the magnitude of said modulated signal pulses to a predetermined value during receipt of said modulated pulses, a discriminator circuit connected to said limiter circuit for demodulating said magnitude limited modulated signal current pulses transmitted from said limiter circuit, an outgoing signaling conductor, means including another signal relay connected to said discriminator circuit and operated by each of said demodulated current pulses transmitted from said discriminator circuit, and a circuit completed in response to each operation of said other signal relay for transmitting a direct current signal pulse over said outgoing signaling conductor.

7. A signal receiver as claimed in claim 6 including a means for biasing said amplifier in accordance to the noise level of said receiver so that current will not flow through said amplifier as long as only noise is received by said receiver.

8. In a signal receiver for receiving dial pulses comprising interrupted pulses of carrier current of an audio frequency and signal current pulses comprising modulated pulses of said carrier current having its frequency modulated by another frequency, an amplifier for amplifying both said interrupted carrier current pulses and said signal current pulses, a first means for detecting said amplified interrupted carrier current during receipt of said dial pulses, an outgoing dialing conductor, a signal relay connected to said first means and operated in response to each of said detected carrier current impulses transmitted from said first means, a circuit completed in response to each operation of said signal relay for transmitting a direct current dial pulse over said outgoing dialing conductor, a limiter circuit connected to said amplifier for limiting the magnitude of said amplified modulated signal pulses to a predetermined value during receipt of said modulated pulses, a discriminator circuit connected to said limiter circuit for demodulating said magnitude limited modulated signal current pulses transmitted from said limiter circuit, an outgoing signaling conductor, means including another signal relay connected to said discriminator circuit and operated by each of said demodulated current pulses transmitted from said discriminator circuit and a circuit completed in response to each operation of said other signal relay for transmitting a direct current signal pulse over said outgoing signaling conductor.

9. In a signal receiver for receiving dial pulses comprising interrupter pulses of carrier current of an audio frequency and signal current pulses comprising modulated pulses of said carrier current having its frequency modulated by another frequency, an amplifier for amplifying both said interrupted carrier current pulses and said signal current pulses, a tuned network coupled to said amplifier, a first means connected to said tuned network for detecting and amplifying said amplified interrupted carrier current during the receipt of said dial pulses, a rectifier connected to said tuned network and said first means to bias said first means in accordance to the noise level of said receiver thereby permitting current to flow through said first means only in response to receipt of interrupted carrier current, an outgoing dialing conductor, a signal relay connected to said first means and operated in response to each of said detected carrier current impulses transmitted from said first means, a circuit completed in response to each operation of said signal relay for transmitting a direct current dial pulse over said outgoing dialing conductor, a limiter circuit connected to said tuned network for limiting the magnitude of said amplified modulated signal pulses to a predetermined value during the receipt of said modulated pulses, a discriminator circuit connected to said limiter circuit for demodulating said magnitude limited modulated signal current pulses transmitted from said limiter circuit, an outgoing signaling conductor, means including another signal relay connected to said discriminator circuit and operated by each of said demodulated current pulses transmitted from said discriminator circuit, and a circuit completed in response to each operation of said other signal relay for transmitting a direct current signal pulse over said outgoing signaling conductor.

10. In a signal receiver for receiving dial pulses comprising interrupted pulses of carrier current of an audio frequency and signal current pulses comprising modulated pulses of said carrier current having its frequency modulated by another frequency, a tuned network, an amplifier connected to said tuned amplifier for amplifying each of said interrupted carrier current pulses during receipt of said dial pulses, a rectifier connected to said tuned network and said amplifier for biasing said amplifier in accordance to the noise level of said receiver to enable current to flow through said receiver only in response to the receipt of carrier current pulses, an outgoing dialing conductor, a signal relay connected to said amplifier and operated in response to each of said amplified carrier current impulses transmitted from said amplifier, a circuit completed in response to each operation of said signal relay for transmitting a direct current pulse over said outgoing dialing conductor, a limiter circuit for limiting the magnitude of said modulated signal pulses to a predetermined value during the receipt of said modulated pulses, a discriminator circuit connected to said limiter circuit for demodulating said magnitude limited modulated signal current pulses transmitted from said limiter circuit, an outgoing signaling conductor, means including another signal relay connected to said discriminator circuit and operated by each of said demodulated current pulses transmitted from said discriminator circuit and a circuit completed in response to each operation of said other signal relay for transmitting a direct current signal pulse over said outgoing signaling conductor.

11. A signal receiver for receiving frequency modulated voice frequency current for signaling and unmodulated voice frequency current for dialing, an amplifier included within said receiver for amplifying said unmodulated current for dialing, an outgoing dialing conductor, a signal relay operated by said unmodulated current from said amplifier for transmitting dialing pulses, and a circuit completed in response to operation of said signal relay for transmitting pulses over said outgoing dialing conductor, a discriminator circuit included within said receiver and controlled by said frequency modulated current for demodulating said frequency modulated current, an outgoing signaling conductor, and means including another signal relay controlled by said demodulated current for transmitting signaling pulses, and a circuit completed in response to said other signal relay for transmitting pulses over said outgoing signaling conductor.

12. A signal receiver as claimed in claim 11 including a means for biasing said amplifier in response to noise frequencies appearing thereto thereby causing said amplifier to conduct only in response to said unmodulated current for dialing.

IMRE MOLNAR.

REFERENCES CITED

The following references are of record in the file of this patent:

UNITED STATES PATENTS

| Number | Name | Date |
|---|---|---|
| 2,155,176 | Wicks | Apr. 18, 1939 |
| 2,159,081 | Grandstaff | May 20, 1949 |
| 2,482,478 | Grandstaff | Sept. 20, 1949 |